(12) United States Patent
Bornstein

(10) Patent No.: US 9,986,857 B2
(45) Date of Patent: Jun. 5, 2018

(54) ADJUSTABLE PICTURE FRAME TOOL

(71) Applicant: Ron Bornstein, Rancho Santa Fe, CA (US)

(72) Inventor: Ron Bornstein, Rancho Santa Fe, CA (US)

( * ) Notice: Subject to any disclaimer, the term of this patent is extended or adjusted under 35 U.S.C. 154(b) by 133 days.

(21) Appl. No.: 15/278,452

(22) Filed: Sep. 28, 2016

(65) Prior Publication Data

US 2018/0084930 A1    Mar. 29, 2018

(51) Int. Cl.
*B43L 7/10*    (2006.01)
*A47G 1/20*    (2006.01)

(52) U.S. Cl.
CPC ................... *A47G 1/205* (2013.01)

(58) Field of Classification Search
CPC ................. A47G 1/205; B43L 7/10
USPC ............................ 33/354, 452, 464
See application file for complete search history.

(56) References Cited

U.S. PATENT DOCUMENTS

| | | | | |
|---|---|---|---|---|
| 4,241,510 A | * | 12/1980 | Radecki | A47G 1/205 33/451 |
| 6,449,863 B1 | * | 9/2002 | Voorhees | A47G 1/205 248/495 |
| 2002/0078583 A1 | * | 6/2002 | Richardson | A47G 1/205 33/613 |
| 2006/0101661 A1 | * | 5/2006 | Schmidt | A47G 1/205 33/613 |
| 2016/0255971 A1 | * | 9/2016 | Cameron | A47G 1/205 |
| 2017/0027341 A1 | * | 2/2017 | Frazier, Jr. | G01C 9/34 |
| 2017/0095094 A1 | * | 4/2017 | Parrillo | A47G 1/205 |
| 2017/0273479 A1 | * | 9/2017 | Snyder | A47G 1/205 |

* cited by examiner

*Primary Examiner* — G. Bradley Bennett

(57) ABSTRACT

An adjustable picture frame tool comprising a longitudinal device for housing slidable members at each end wherein the slidable members have the ability to expand and contract in length at both ends of the longitudinal device is disclosed. The longitudinal device and end slidable members each defines a plurality of center spaced holes along their longitudinal axis, respectively. In one preferred embodiment the holes are spaced a mm apart from each other. A clickable circular locking button is located in the middle of the longitudinal device that allows the slidable members to be locked in place to the longitudinal device. In use, a simple click or push of the center button locks the slidable members relative to the longitudinal device wherein a second click of the button and the slidable members can move either outwards or inwards.

6 Claims, 3 Drawing Sheets

ADJUSTABLE PICTURE FRAME TOOL

FIELD OF THE INVENTION

The present invention relates to a longitudinal device for use in hanging wall-supported objects, such as pictures, mirrors, paintings, and the like. More particularly, the invention relates to a longitudinal device for hanging such objects quickly, efficiently, and in a level orientation.

BACKGROUND OF THE INVENTION

Numerous picture hanging aids or devices are known in the art. A common technique involves attaching an eye screw or hook into the back of the picture frame, near the top center, and hanging this hook over a nail driven into the wall. The disadvantage of this approach is that it requires an extremely careful measurement to locate the screw or hook on the vertical center line of the picture, or otherwise the picture will hang off-level. Further, the use of a single suspension point permits shifting of the picture to an off-level position when any vibration occurs.

An improved approach involves fastening eyes or hooks on both sides of the back of the picture frame and stretching a support wire between them. The picture can then be supported by engaging the wire on two or more hooks fastened to the wall at properly spaced apart positions. However, this approach requires a number of precise measurements to determine the appropriate level position for the hooks on the frame and the hangers on the wall. These measurements can be a particularly tedious and time consuming task in homes or institutions having a large number of pictures each requiring accurate leveling. The alternative to making the tedious measurements is the trial and error method which usually becomes just as time consuming and tedious.

Therefore, a need exists for an adjustable picture frame tool that removes the tediousness and/or the trial and error frustration in determining the proper and exact location of the points at which the picture or mirror hanging hooks are to be fastened to the wall. Furthermore, there is a need to provide an adjustable picture frame tool that can be used by any person for hanging a picture or mirror on a wall regardless of that person's lack of experience in this art.

SUMMARY

An adjustable picture frame tool for accurately hanging pictures and the like is provided. The adjustable picture frame tool comprises a longitudinal device having the size roughly of a skinny ruler for housing slidable members at each end wherein the slidable members have the ability to expand and contract in length at both ends of the longitudinal device. The longitudinal device and end slidable members each defines a plurality of center spaced holes along their longitudinal axis, respectively. In one preferred embodiment the holes are spaced a mm apart from each other. A clickable circular locking button is located in the middle of the longitudinal device that allows the slidable members to be locked in place to the longitudinal device. In use, a simple click or push of the center button locks the slidable members relative to the longitudinal device wherein a second click of the button and the slidable members can move either outwards or inwards.

The measuring tool in accordance with the present invention allows for the simplicity of mounting any type of picture, mirror, artwork and the like, when two or more holes are needed for mounting on any surface such as a wall. In use, the longitudinal device is first laid upon the back of a picture frame wherein the extraction of the slidable members relative to the longitudinal device once placed against a mounting service will assure a perfect placement of holes by aligning the holes of the longitudinal device with the fixed slidable members that are needed to be drilled into the surface of a wall or other structure for correct mounting placement.

In a preferred embodiment, located and mounted at the top center of the longitudinal device is a leveler or horizontally mounted level bubble roughly 1-2 inches in length. The leveler will assure the marking of the holes will be even.

In another preferred embodiment, the longitudinal device and slidable member ends will have the ability to expand upwards of 60".

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION OF THE INVENTION

Figure 1:
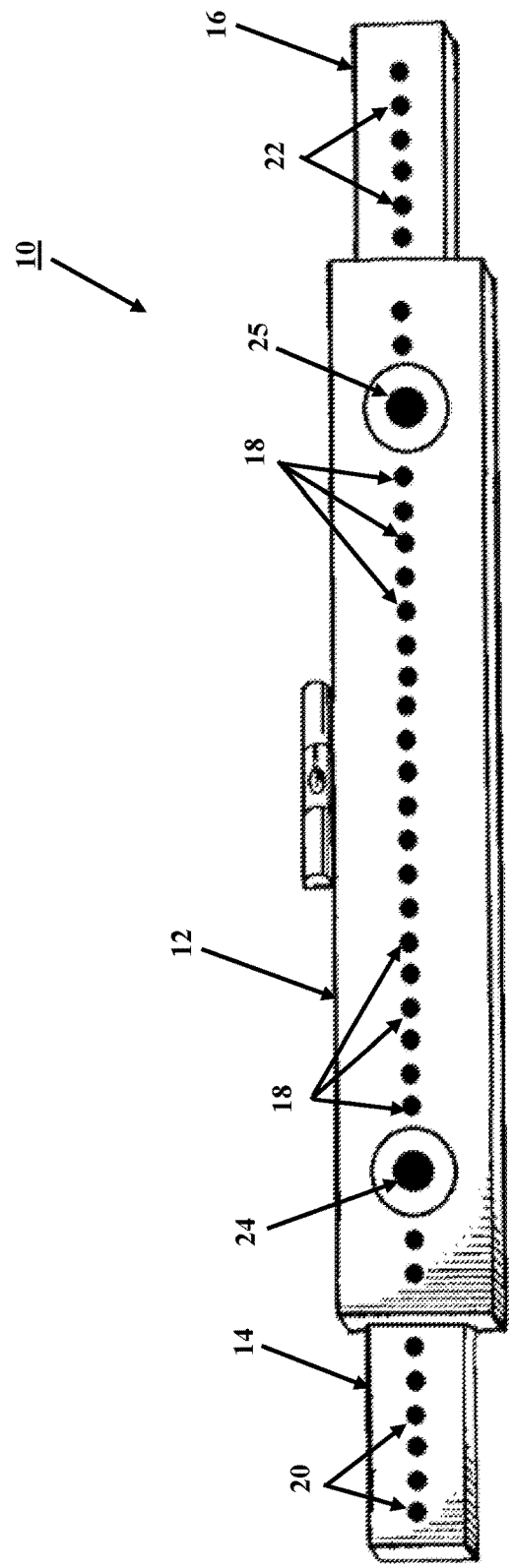
FIG. 1 is a front perspective view of an adjustable picture frame tool for accurately hanging pictures in accordance with the present invention.
Figure 2:
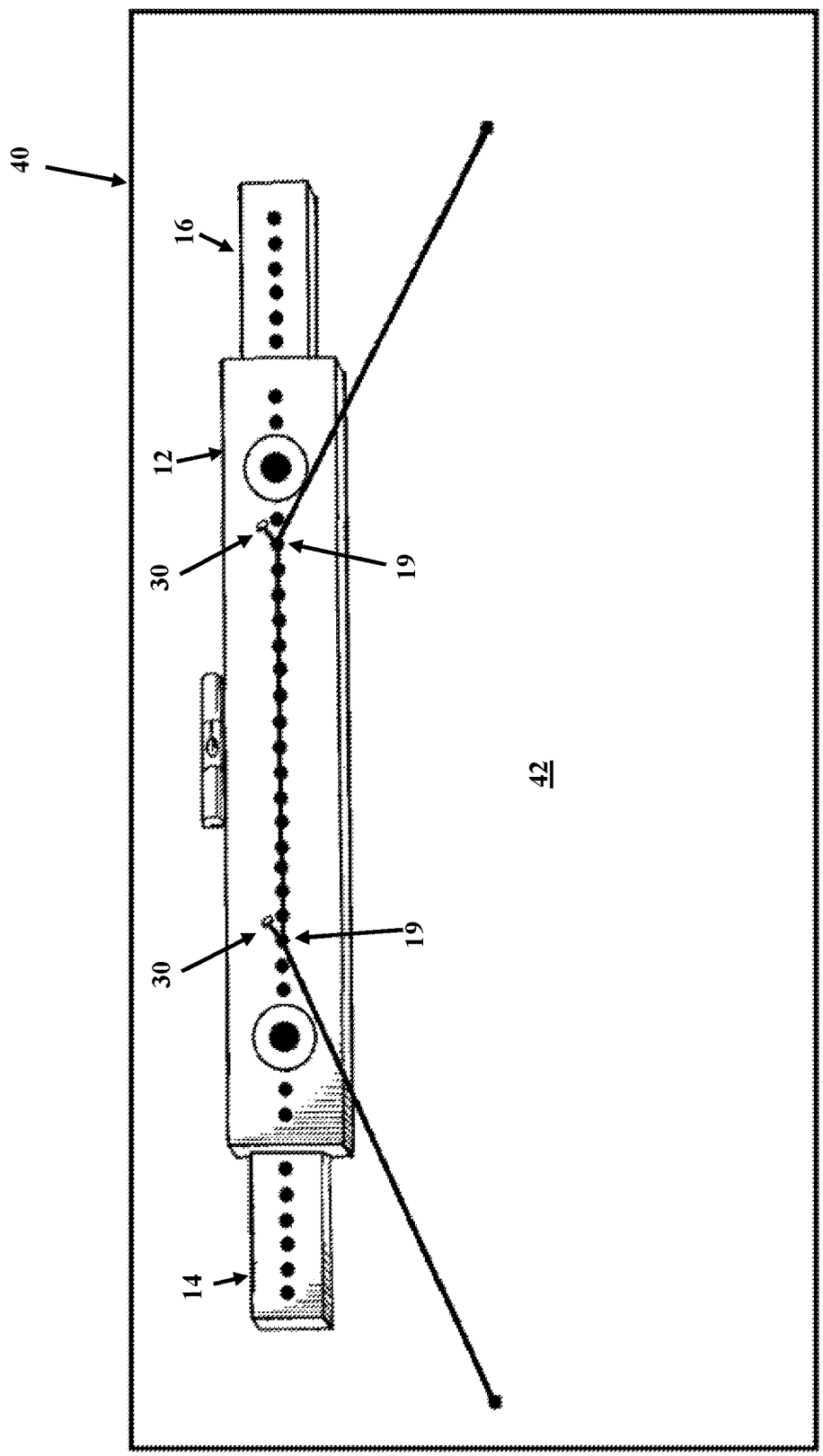
FIG. 2 is a front perspective view of the adjustable picture frame tool in use with the back of a picture frame in accordance with the present invention.

Referring now to FIG. 1, there is shown and illustrated an adjustable picture frame tool 10 for accurately hanging pictures and the like. The adjustable picture frame tool 10 comprises a longitudinal device 12 having the size roughly of a skinny ruler for housing slidable members 14, 16 at each end wherein the slidable members 14, 16 have the ability to expand and contract in length at both ends of the longitudinal device 12. The longitudinal device 12 and its end slidable members 14, 16 each defines a plurality of center spaced holes 18, 20, 22 along their longitudinal axis, respectively. In one preferred embodiment the holes 18, 20, 22 are spaced a mm apart from each other. Two clickable circular locking buttons 24, 25 are located at opposite ends of the longitudinal device 12 that allows the slidable members 14, 16 to be locked in place to the longitudinal device 12. In use, a simple click or push of opposing end buttons 24, 25 locks the slidable members in position relative to the longitudinal device such that the spaced holes 20 and 22 are in-line with holes 18 of the longitudinal device 12 wherein a second click of opposing end buttons 24, 25 and the slidable members 14, 16 can move either outwards or inwards for aligning the holes 20 and 22 to a different hole location relative to the longitudinal device 12.

Figure 3:
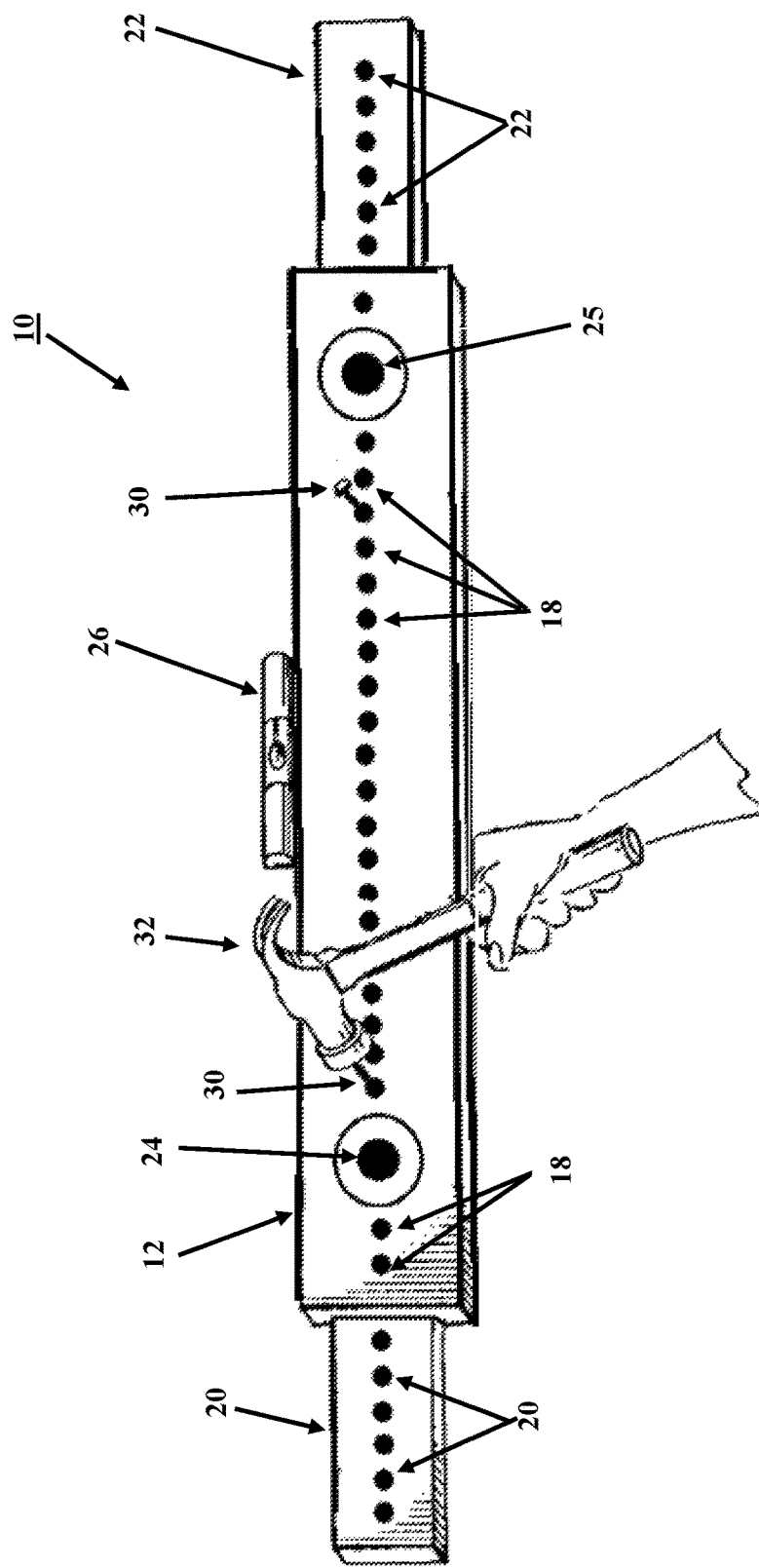
FIG. 3 is a front perspective view of the adjustable picture frame tool, after having obtained the appropriate spacing, placed level against a wall indicating the location of the proper placement of two nail wall attachments.

The adjustable picture frame tool 10 in accordance with the present invention is used as a measuring tool that allows for the simplicity of mounting any type of picture, mirror, artwork and the like, when two or more holes 19 are needed for mounting on any surface such as a wall. In use, the longitudinal device 12 is first laid upon the back 42 of a picture frame 40 wherein the extraction of the slidable members 14, 16 relative to the longitudinal device 12 once placed against a mounting service (ie back 40 of the picture frame 42) will assure a perfect placement of holes by aligning the holes 18 of the longitudinal device 12 with the holes 20 and 22 of the fixed slidable members 14, 16 that are needed to be drilled into the surface of a wall (not shown) by tapping nails 30 using hammer 32 by way of example for correct mounting placement as shown in FIG. 3.

Turning once again to FIG. 3, located and mounted at the top center of the longitudinal device 12 is a leveler 26 or horizontally mounted level bubble roughly 1-2 inches in length. The leveler 26 will assure the marking of the holes 18 when aligned with holes 20 and 22 will be even. Once again by way of example but not of limitation, the hole locations are first marked using nails 30 wherein the longitudinal device 12 is removed and holes may now be drilled or tapped using the marked locations. In a preferred embodiment, the length of the longitudinal device and fully extended slidable member ends will have the ability to expand outwards to 60 inches or 5 feet.

In summary, the present invention is directed to a longitudinal device having the size roughly of a skinny ruler that has the ability to expand and contract in length at both ends and further defines a plurality of holes along its longitudinal axis. In one preferred embodiment the holes are spaced a mm apart from each other wherein clickable circular locking buttons are located at each end that allows the expansion of the device to be locked in place. In use, a simple second click of the buttons and the device can move either outwards or inwards. Located and mounted at the top center of the device is a leveler or horizontally mounted level bubble roughly 1-2 inches in length. In one preferred embodiment, the device will have the ability to expand upwards of 60". The purpose of this measuring tool is to allow the simplicity of mounting any type of picture, mirror, artwork and the like, wherein two or more holes are needed for mounting on any surface such as a wall. The device is first laid upon the back of a picture frame wherein the extraction of the device once placed against a mounting service will assure a perfect placement of holes that would need to be drilled into the surface for correct placement. Lastly, a leveler located and mounted on top of the device assures the marking of the holes will be even.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An adjustable picture frame tool for accurately hanging pictures comprising:
   a longitudinal device for housing slidable members at each end of said longitudinal device wherein said slidable members have an ability to expand and contract in length at both ends of said longitudinal device; wherein
   said longitudinal device and said slidable members each defines a plurality of center spaced holes along their longitudinal axis; and
   a clickable circular locking button located at each end of said longitudinal device that allows said slidable members to be locked in place to said longitudinal device, wherein a click of said buttons locks said slidable members relative to said longitudinal device and wherein a second click of said buttons allows said slidable members to move either outwards or inwards.

2. The adjustable picture frame tool according to claim 1 wherein the adjustable picture frame tool having the size roughly of a skinny ruler.

3. The adjustable picture frame tool according to claim 1 wherein said plurality of center spaced holes are spaced a mm apart from each other.

4. The adjustable picture frame tool according to claim 1 wherein said longitudinal device is first laid upon a back of a picture frame wherein extraction of said slidable members relative to said longitudinal device once placed against a mounting service will assure a perfect placement of said center holes by aligning said holes of said longitudinal device with said fixed slidable members that are needed to be drilled into the surface of a wall or other structure for correct mounting placement.

5. The adjustable picture frame tool according to claim 1 wherein located and mounted at a top center of said longitudinal device is a leveler or horizontally mounted level bubble wherein said leveler assures marking of said center holes will be even.

6. The adjustable picture frame tool according to claim 1 wherein said longitudinal device and said slidable member ends have the ability to expand outwards to 60 inches.

* * * * *